Oct. 10, 1967

J. G. ROGERS ETAL 3,346,738

RADIATION SENSITIVE HIGH RESOLUTION OPTICAL TRACKER

Filed Nov. 10, 1964

James G. Rogers
Norbert L. Moulin,
INVENTORS.

3,346,738
RADIATION SENSITIVE HIGH RESOLUTION OPTICAL TRACKER
James G. Rogers, Fullerton, and Norbert L. Moulin, Placentia, Calif., assignors, by mesne assignments, to the United States of America as represented by the Secretary of the Army
Filed Nov. 10, 1964, Ser. No. 410,329
10 Claims. (Cl. 250—203)

ABSTRACT OF THE DISCLOSURE

A system using two electromagnetically-deflected mirrors rotating about orthogonal axes for both nutation and error correction so as to achieve optical tracking and nutating by use of a single moving element for each axis. An electromechanical deflection system is used for both tracking and spatial temporal coding (nutation) of the incoming beam.

---

Figure 1:
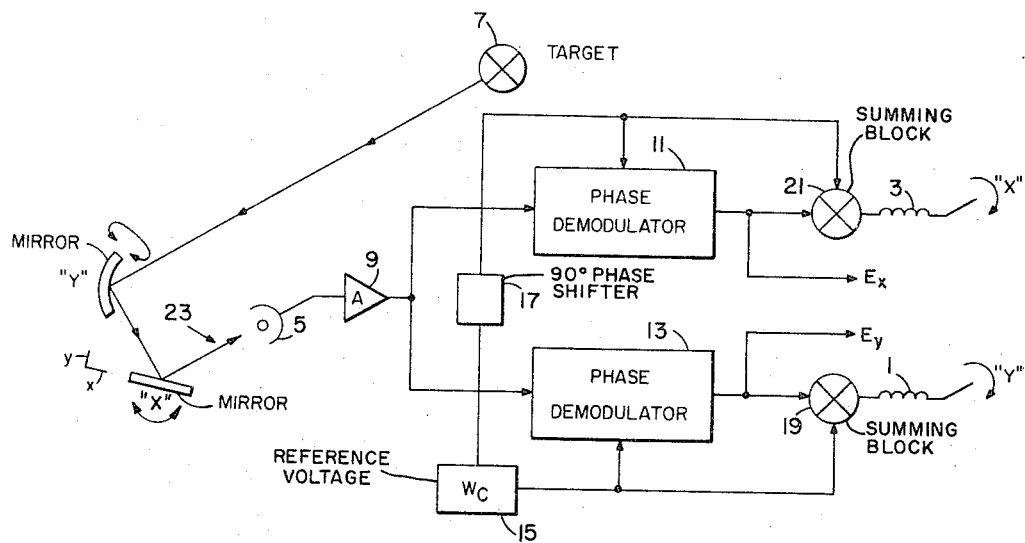

Conventional optical trackers mount a sensing device on a servo-controlled platform which responds to the output of the sensor. This necessitates the actuation of an appreciable mass by the servos in the act of tracking. This in turn requires that larger servos be used and more power be applied to them, which will cause more noise and less accuracy. Typical accuracies of sophisticated systems vary from one to four milliradian resolution. A system which is capable of one tenth-milliradian resolution over about three times the usual tracking angle is needed for present-day tracking.

It is an object of this invention to provide a high-resolution optical tracker.

A further object of the present invention is to provide a tracking system in which the tracking and nutating processes are combined in a single moving element for each axis.

A still further object to the invention is to provide a single electromechanical deflection system for both tracking and spatial temporal coding of an incoming beam.

Figure 2:
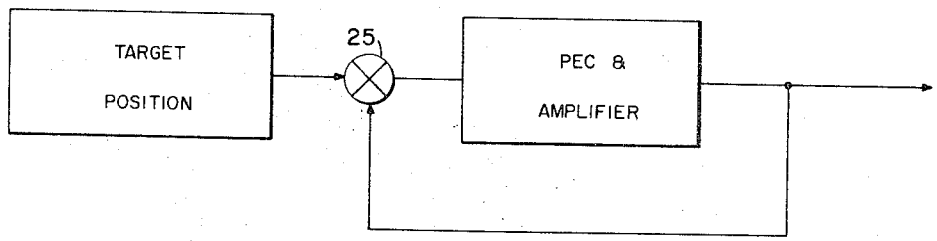

The invention further resides in certain novel features of construction, combinations and arrangements of parts, and further objects and advantages of the invention will be apparent to those skilled in the art to which it pertains, from the following description of the preferred embodiment thereof described with reference to the accompanying drawing, which forms a part of the specification, and wherein the same reference characters represent corresponding parts throughout the several views, and in which:

FIGURE 1 shows a schematic diagram illustrating a preferred form of the present invention; and FIGURE 2 illustrates the feedback loop, in block diagram, according to the invention.

In order to better understand the operation of the system described in the figures, a description of their components referred to its first presented. A first mirror Y which is mounted for oscillation about a y axis is positioned by servo coil means 1. The first mirror Y is a primary mirror which is concave to focus the energy from the target. A second mirror X, shown as flat but which could also form part of the focusing, is mounted for oscillation about an x axis and is positioned by another servo coil means 3. Coil means 1 and 3 and their mechanical deflection connections to mirrors X and Y could be a mechanism similar to that of a permanent-magnet dynamic loudspeaker.

A photo-electric cell 5, such as a photovoltaic cell, is located so that it will receive energy (usually infrared energy) from a source located on a target 7. The target may also be illuminated so that the photo-electric cell 7 can pick up a reflected signal. The output of the photo-electric cell 7 is fed to an A.C. amplifier 9 which amplifies the output of cell 7 and sends its signal to phase demodulators 11 and 13.

A source of voltage 15 having a frequency $w_c$ is applied directly to phase demodulator 13 and acts as a reference phase. The source 15 is applied to phase demodulator 11 by way of a 90° phase shifter 17 and acts as the reference phase shifted 90° for it. The source 15 is also sent to coils 1 and 3 by way of summing blocks 19 and 21 and phase shifter 17. Outputs $E_x$ and $E_y$ may be fed to an integrating circuit means to indicate the target position. The voltage source 15 and phase shifter 17 comprise a source of two carrier voltages.

Optical trackers may be of either the active or the passive variety. Passive schemes consist of imaging the moving source (target) on a photosensitor so designed as to yield a signal proportional to the direction and distance of the image from a zero-reference point. Some photosensitors (e.g. certain solid-state devices) generate such an output directly; others employ spatial and/or temporal coding, like the familiar nutation circle, to obtain positional error information with a photocell which may be optimized for source energy and wavelength. Accuracies of one part in twenty are easily obtainable with passive trackers. Increases in these figures by a factor of two or three may be had only with corresponding difficulties.

When a passive tracker is mounted on a platform whose attitude responds to the negative tracking error, it becomes an active system. Because the photosensor is then used only as a nulling device; therefore constraints on overall linearity are relaxed but stability and gain about the null point become critical. Star trackers fall in this category, as do optically-guided (e.g. infrared seeking) missiles. The system described herein is an active technique, in which a single electromechanical deflection system is used for both tracking and spatial-temporal coding of the incoming beam.

Operation

Energy from a source situated on the moving target (such as its motor) is directed to a photo-electric cell 5 by reflection from two mirrors, X and Y. Each mirror is pivoted on an axis perpendicular to its respective co-ordinate axis in response to electric current flow through their respective solenoids 1 and 3. A constant-amplitude carrier signal 15 of frequency $w_c$ is applied in phase quadrature to solenoids 1 and 3. This causes a circular deflection of the light beam 23 about a point of maximum sensitivity of the photo-electric cell 5. When the photo-electric cell is exactly in the center of the circle, its carrier-frequency output is zero (it has a steady D.C. output). Amplifier 9 being an A.C. amplifier will not transmit this D.C. voltage. Should the target change its position the position of the circle will shift. This will result in a pulsating output from the photo-electric cell 5 at the carrier frequency. The amplitude will be proportional to the degree of shift, and the phase will give an indication of the direction of the shift and therefore the direction vector of the target.

The output of the amplifier 9 is compared with the carrier-frequency $w_c$ and the carrier-frequency $w_c$ shifted 90° by phase demodulators 13 and 11 respectively, so as to convert the signal output from amplifier 9 into x and y quadrature components of error position of the mirrors. Therefore, it can be seen that demodulators 11 and 13 together act as a converter of the signal from amplifier 9. These are fed negatively through summing blocks 19 and 21 to servo coils 1 and 3 of the servo system. The result is a nulling servomechanism, in which each mirror responds to the sum of a sinusoidal carrier and a D.C. position voltage output from a phase demodulator in such a way as to maintain the photo-electric cell within the center of the circle made by the beam from the energy source.

It may be shown from classical servomechanism theory that the D.C. position voltage $E_x$ and $E_y$ from the phase demodulators 11 and 13 is proportional to the inclination of the source with respect to the zero reference, plus an error equal to the reciprocal of the system gain. The feedback loop is shown more clearly in FIGURE 2, in which the carrier is disregarded for clarity. The mirrors 25 are seen to comprise the summing blocks of the overall system.

While in accordance with the provisions of the statutes, we have illustrated and described the best forms of the invention now known to us, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features. Accordingly, we desire the scope of our invention to be limited only by the appended claims.

We claim:

1. A tracking system comprising first and second mirror means; said first mirror means adapted to be rotatable about a first axis; said second mirror means adapted to be rotatable about a second axis; a source of electromagnetic energy on a target to be tracked; said mirrors reflecting said energy into a beam to a sensing device of a position detecting means; said position detecting means having an output voltage which represents a direction vector of a target; converter means in circuit with the output voltage of said position detecting means for converting said voltage into first and second quadrature voltages which represent said vector; first and second servo means for moving said first and second mirrors respectively; said first quadrature voltage being in circuit with the first servo means for controlling the rotation of said first mirror means; and said second quadrature voltage being in circuit with the second servo means for controlling the rotation of said second mirror means.

2. A tracking system as set forth in claim 1, wherein said first and second axes are at right angles to each other.

3. A tracking system as set forth in claim 2 wherein said sensing device is a photo-electric cell.

4. A tracking system as set forth in claim 2 further comprising a source of carrier voltages connected to said servo means so as to cause said beam to nutate about said sensing device.

5. A tracking system as set forth in claim 4, wherein said source of carrier voltages is connected directly to said first servo means; connected through a 90° phase shifter to said second servo means; and is connected to said converter means to act as a reference therefor.

6. A tracking system as set forth in claim 5, wherein said converter means consists of first and second phase demodulators; said first phase demodulator having as an output said first quadrature voltage; and said second phase demodulator having as an output said second quadrature voltage.

7. A tracking system as set forth in claim 6, wherein a carrier voltage is used directly as a reference in said first phase demodulator; and the carrier voltage shifted 90° is used as a reference in said second phase demodulator.

8. A tracking system as set forth in claim 7, wherein said sensing device is a photo-electric cell.

9. A tracking system as set forth in claim 8, wherein said detecting means consists of said photo-electric cell having its output connected to an A.C. amplifier; and said amplifier having its output connected to inputs of said first and second phase demodulators.

10. A tracking system as set forth in claim 9, wherein the axes of said mirrors are in the same plane and the energy emanating from the target is reflected from and focused by said first mirror into the beam; and said beam is reflected by said second mirror to the photo-electric cell.

References Cited

UNITED STATES PATENTS

| 2,967,247 | 1/1961 | Turck | 250—203 |
| 3,117,231 | 1/1964 | Haynes | 250—203 |
| 3,263,088 | 7/1966 | Goldfischer | 250—83.3 |

FOREIGN PATENTS 918,340  2/1963  Great Britain.

WALTER STOLWEIN, *Primary Examiner.*